US009102320B2

United States Patent
McGee et al.

(10) Patent No.: US 9,102,320 B2
(45) Date of Patent: Aug. 11, 2015

(54) PREDICTIVE AFTERTREATMENT SCHEDULING FOR A VEHICLE

(75) Inventors: Ryan Abraham McGee, Ann Arbor, MI (US); Qing Wang, Canton, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 546 days.

(21) Appl. No.: 13/613,757

(22) Filed: Sep. 13, 2012

(65) Prior Publication Data

US 2014/0074386 A1    Mar. 13, 2014

(51) Int. Cl.
| | | |
|---|---|---|
| *F01N 3/00* | (2006.01) | |
| *F01N 9/00* | (2006.01) | |
| *B60W 20/00* | (2006.01) | |
| *B60W 50/00* | (2006.01) | |

(52) U.S. Cl.
CPC ........... *B60W 20/104* (2013.01); *B60W 20/102* (2013.01); *B60W 20/1082* (2013.01); *B60W 50/0097* (2013.01); *B60W 2550/143* (2013.01); *B60W 2550/402* (2013.01); *B60Y 2300/476* (2013.01); *B60Y 2400/432* (2013.01); *Y02T 10/84* (2013.01)

(58) Field of Classification Search
CPC ............... F01N 3/00; F01N 3/02; F01N 9/00; B60W 10/06; B60W 10/08; B60W 10/26; B60W 20/00; F02D 41/0245; F02D 41/0275; F02D 41/028; F02D 41/029; F02D 2041/026; Y02T 10/6217; Y02T 10/6221; Y02T 10/6286
See application file for complete search history.

(56) References Cited

U.S. PATENT DOCUMENTS

| | | | |
|---|---|---|---|
| 6,032,461 | A | 3/2000 | Kinugasa et al. |
| 7,261,086 | B2 * | 8/2007 | Nuang ........................ 123/436 |
| 7,980,062 | B2 * | 7/2011 | Barton et al. .................. 60/284 |
| 8,452,474 | B2 * | 5/2013 | Ogiso ............................ 701/22 |
| 8,789,361 | B2 * | 7/2014 | Arntson et al. ................ 60/295 |
| 2003/0135323 | A1 | 7/2003 | Votsmeier et al. |
| 2004/0144087 | A1 | 7/2004 | Kondou et al. |
| 2005/0166580 | A1 | 8/2005 | Pfaeffle et al. |
| 2007/0125074 | A1 | 6/2007 | Marquardt |
| 2010/0063659 | A1 | 3/2010 | Ogiso |

* cited by examiner

*Primary Examiner* — Hieu T Vo
(74) *Attorney, Agent, or Firm* — David B. Kelley; Brooks Kushman P.C.

(57) ABSTRACT

A method to control a hybrid electric vehicle includes operating a compression ignition engine based on an engine-on request, and performing an exhaust aftertreatment procedure when a fraction of an engine-on time is greater than an aftertreatment condition threshold. A vehicle has a compression ignition engine with an exhaust aftertreatment system, and a controller. The controller is configured to: (i) operate the engine based on an engine-on request, and (ii) perform an exhaust aftertreatment procedure for the vehicle when an engine-on fraction for a designated time is greater than an aftertreatment condition threshold. A computer readable medium having stored data representing instructions executable by a controller to control a vehicle includes instructions for operating the engine based on an engine-on request, and instructions for performing an exhaust aftertreatment procedure for the vehicle when an engine-on time fraction is greater than an aftertreatment condition threshold.

20 Claims, 5 Drawing Sheets

Predicted Trip Speed or Power Profile

Predicted Trip Engine ON/OFF

PREDICTIVE AFTERTREATMENT SCHEDULING FOR A VEHICLE

TECHNICAL FIELD

Various embodiments relate to a vehicle, such as a hybrid vehicle having a compression ignition engine, and a method to control an exhaust aftertreatment for the vehicle, such as a diesel particulate filter regeneration.

BACKGROUND

The engine operation in a hybrid electric vehicle (HEV) is significantly different than in a conventional vehicle as the vehicle may be operated using electric power only. In certain hybrids, such as plug-in electric hybrids (PHEVs), battery energy may be prioritized, and the engine may only run for a short time period during a vehicle operation cycle, or from key on to key off.

An HEV or PHEV with a diesel engine require emission control devices and corresponding control strategies for the devices. The diesel aftertreatment procedures or requirements may force more frequent and continuous engine-on operation. Examples of aftertreatment procedures include: diesel particulate filter (DPF) regeneration (Regen), catalyst light off, diesel oxidation catalyst (DOC) heat-up, other exhaust temperature maintenance procedures, and maintaining in-use monitor performance ratios (IUMPRs).

Energy management in a diesel PHEV favors reduced or minimum engine-on time to gain fuel economy benefits. For example, in a DPF Regen, additional fuel and engine-on time may be needed to complete the aftertreatment procedure. In a HEV or PHEV, the engine-on time is less than that of a conventional vehicle, and operating the engine for the purpose of completing an aftertreatment procedure leads to lower fuel economy for the vehicle.

There may be additional drivability concerns or expectations, like PHEV users, expecting the engine to be off when the power demand is low and the vehicle speed is low. The aftertreatment procedures need to be completed without significantly impacting fuel economy or drivability.

SUMMARY

In an embodiment, a method is provided to control a hybrid electric vehicle with a compression ignition engine. A compression ignition engine is operated based on an engine-on request. An exhaust aftertreatment procedure is performed when a fraction of an engine-on time is greater than an aftertreatment condition threshold.

In another embodiment, a vehicle is provided with a compression ignition engine having an exhaust aftertreatment system, and a controller electronically coupled to the engine. The controller is configured to: (i) operate the engine based on an engine-on request, and (ii) perform an exhaust aftertreatment procedure for the vehicle when an engine-on fraction for a designated time is greater than an aftertreatment condition threshold.

In yet another embodiment, a computer readable medium having stored data representing instructions executable by a controller to control a vehicle is provided with instructions for operating the engine based on an engine-on request, and instructions for performing an exhaust aftertreatment procedure for the vehicle when an engine-on time fraction is greater than an aftertreatment condition threshold.

Various embodiments according to the present disclosure have associated advantages. Opportunistic scheduling of aftertreatment procedures may be scheduled during driving routes such that they occur during an engine-on time window for the vehicle, thereby minimally impacting fuel economy and drivability expectations, and reducing vehicle emissions. The aftertreatment procedure, such as a DPF Regen, may be scheduled at an appropriate time during the driving cycle using historical information, predicted information, and/or current vehicle state. An engine-on condition may be triggered by events such as a driving power request or battery state of charge (SOC) condition. The method establishes an engine-on time percentage to result in an engine-on time estimation which is used to opportunistically schedule and conduct an aftertreatment procedure.

DETAILED DESCRIPTION

Figure 1:
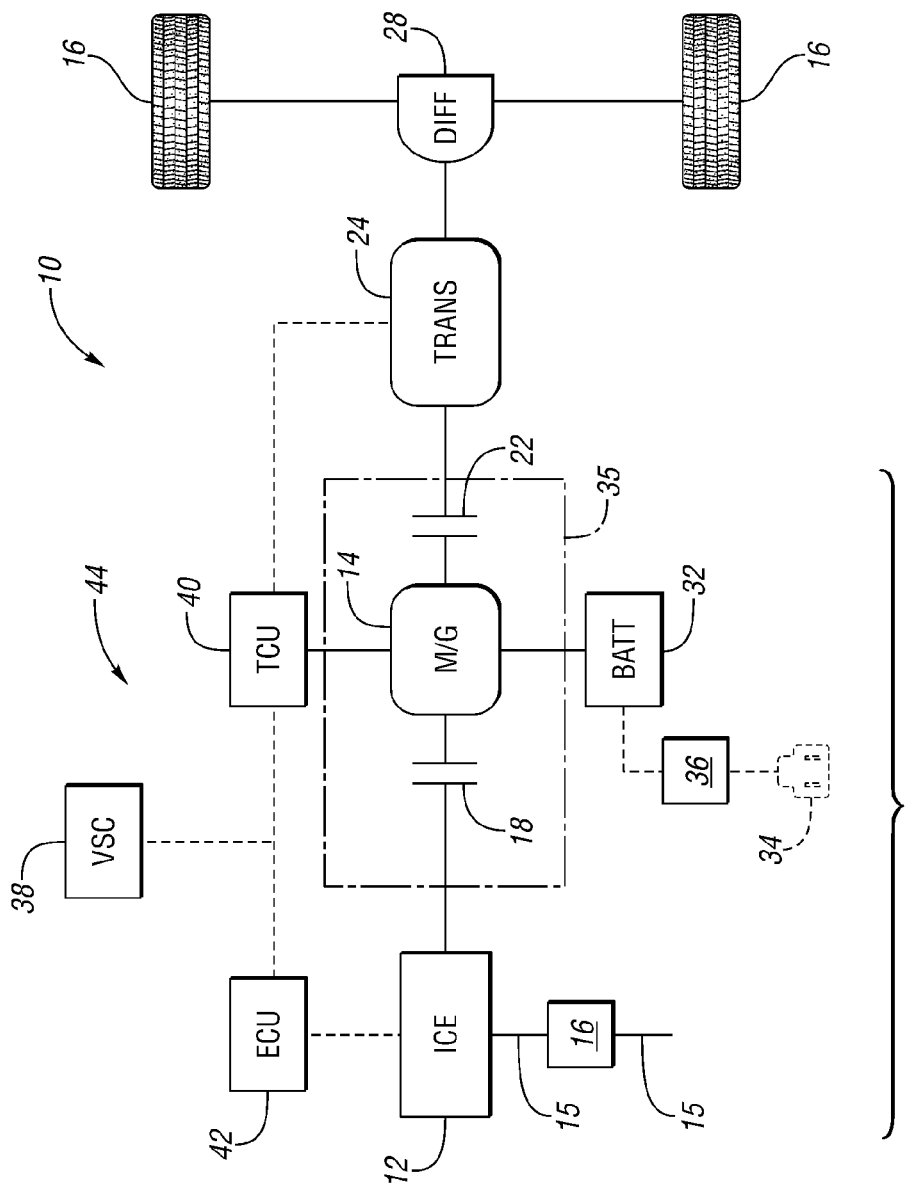
FIG. 1 is a schematic representation of a hybrid electric vehicle having aftertreatment control according to an embodiment.

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Providing aftertreatment procedures for a diesel hybrid vehicle may be difficult because of the uncertainty in engine-on time and engine operation. Engine operation is connected to future vehicle operation which includes driving uncertainties and/or unanticipated environmental conditions. Having an engine-on time (EOT) for a vehicle cycle allows scheduling and conducting an opportunistic aftertreatment procedure while maintaining fuel efficiency and drivability.

A hybrid electric vehicle (HEV) structure is used in the figures and to describe the various embodiments below; however, it is contemplated that the various embodiments may be used with vehicles having other propulsion devices or combinations of propulsion devices as is known in the art. HEVs typically have power supplied by a battery powered electric motor, an engine, or a combination thereof. Some HEVs have a plug-in feature which allows the battery to be connected to an external power source for recharging, and are called plug-in HEVs (PHEVs). Electric-vehicle mode (EV mode) in HEVs and PHEVs allows the vehicle to operate using the electric motor alone, while not using the engine, which may enhance the ride comfort, the fuel economy, and the environment through zero emissions from the vehicle during this period of operation.

The opportunistic aftertreatment procedures as described herein may also be used with a conventional diesel engine vehicle to prevent initiation of an aftertreatment procedure on a trip having a short duration where the procedure cannot be completed during the trip. By running opportunistic aftertreatment procedures during trips having sufficient time to complete an aftertreatment procedure, the procedure success rate and fuel economy may be increased.

In one example, the vehicle is a hybrid vehicle (HEV) having a compression ignition engine, such as a diesel engine, and additionally may have the ability to connect to an external electric grid, such as in a plug-in electric hybrid vehicle (PHEV). A PHEV uses a larger capacity battery pack than a standard hybrid vehicle, and it adds a capability to recharge the battery from an electric power grid, which supplies energy to an electrical outlet at a charging station, which provides an additional electric energy stored in the battery from the grid after each battery charge event. This further improves the overall vehicle system operating efficiency in an electric driving mode and in a hydrocarbon/electric blended driving mode.

While most conventional HEVs are operated to maintain the battery state of charge (SOC) around a constant level, PHEVs use as much pre-saved battery electric (grid) energy as possible before the next battery charge event. The relatively low cost grid supplied electric energy is expected to be fully utilized for propulsion and other vehicle functions after each charge. After the battery SOC decreases to a low conservative level during a charge depleting event, the PHEV resumes operation as a conventional HEV in a so-called charge sustaining mode until the battery is re-charged.

FIG. 1 illustrates an HEV 10 powertrain configuration and control system. The HEV configuration as shown is for example purposes only and is not intended to be limiting as the present disclosure applies to vehicles of any suitable architecture, including HEVs and PHEVs.

FIG. 1 illustrates a schematic diagram of a hybrid vehicle 10 according to an embodiment. The vehicle 10 includes an internal combustion engine (ICE) 12, and an electric machine, which, in the embodiment shown in FIG. 1, is a motor generator (M/G) 14, which functions as a traction motor. The M/G 14 is configured to transfer torque to the engine 12 or to the vehicle wheels 16. The engine 12 may be a compression ignition engine, and may use various fuel sources, such as diesel, biofuel, or the like. The engine 12 has an exhaust 15, which flows through an aftertreatment system 16, such as a DPF, DOC, and/or the like, and to the environment.

In one embodiment, the aftertreatment system 16 is a DPF that filters particulate matter, such as soot and the like, from the exhaust stream of the engine 12. Over time the particulate filter 16 accumulates matter, which may reduce flow through the filter 16. Higher exhaust temperatures may be used to clean the particles from the filter 16. Extra fuel is injected into the engine 12 and the higher exhaust temperature burns off particulates, such as soot, from the filter 16. This process is termed DPF Regeneration (DPF Regen). A control strategy for the aftertreatment system 16 determines when the regeneration process is required and then modifies the fuel control strategy to increase the exhaust temperature. For example, in a conventional vehicle this process may occur roughly every 300 miles and it may take twenty minutes to complete. If a DPF Regen process is interrupted prior to completion (e.g. due to a key off event), another DPF Regen process will be initiated all over at a later time for completion. Since the DPF Regen utilizes additional fuel, it may be less desirable to start the regeneration process if a drive cycle will not allow completion. Fuel economy may be degraded during drive cycles in which a DPF Regen takes place. Overall fuel economy may be further degraded if the Regen process is interrupted during the first attempt prior to completion.

The M/G 14 is connected to the engine 12 using a first clutch 18, also known as a disconnect clutch or upstream clutch. A second clutch 22, also known as a launch clutch or downstream clutch, connects the M/G 14 to a transmission 24, and all of the input torque to the transmission 24 flows through the launch clutch 22. The launch clutch 22 can be controlled to isolate the driveline 26, which includes the M/G 14 and the engine 12, from the transmission 24, differential 28, and the vehicle drive wheels 16. Although the clutches 18, 22 are described and illustrated as hydraulic clutches, other types of clutches, such as electromechanical clutches may also be used. In one embodiment, the clutch 22 is implemented by a torque converter and bypass clutch.

In some embodiments, the vehicle 10 also includes a starter motor (not shown) operatively connected to the engine 12, for example, through a belt or gear drive. The starter motor may be used to provide torque to start the engine 12 without the addition of torque from the M/G 14.

The M/G 14 is in communication with a battery 32. The battery 32 may be a high voltage battery. The M/G 14 may be configured to charge the battery 32 in a regeneration mode, for example when a driver demands negative wheel torque, through regenerative braking, or the like. In one example the battery 32 is configured to connect to an external electric power grid, such as for a plug-in hybrid electric vehicle (PHEV) with the capability to recharge the battery from the electric power grid, which supplies energy to an electrical outlet at a charging station. The battery 32 is additionally rechargeable in a PHEV vehicle 10 configuration (shown in phantom), using a receptacle 34 which is connected to the power grid or other outside electrical power source and is coupled to battery 26, possibly through a battery charger/converter 36.

In an embodiment, a PHEV 10 prioritizes battery 32 energy such that the engine 12 may not run for an entire drive cycle. Alternatively, the engine 12 may only operate for a short time period. The manner in which the engine 12 is operated is driven by the vehicle 10 usage pattern and various powertrain constraints ranging from full vehicle powertrain capability in an electric-only vehicle (EV) to a blended vehicle powertrain capability where engine 12 operation may be required when the vehicle 10 is travelling above a certain speed or if the power demanded by the driver exceeds battery 32 limits. A PHEV may have two primary modes of operation: charge depleting and charge sustaining. In a charge depleting mode, the use of battery 32 energy is prioritized to discharge the battery. Once a target depth of discharge is reached, the PHEV operates in a charge sustaining mode. In the charge sustaining mode, the PHEV maintains the battery 32 SOC around a fixed level.

A vehicle system controller (VSC) 38 transfers data between a transmission control unit (TCU) 40 and an engine control unit (ECU) 42 and is also in communication with various vehicle sensors. The control system 44 for the vehicle 10 may include any number of controllers, and may be integrated into a single controller, or have various modules. Some or all of the controllers may be connected by a controller area network (CAN) or other system. The control system 44 may be configured to control operation of the various components of the transmission 24, the motor generator assembly 35, and the engine 12 under any of a number of different conditions.

The crankshaft or output shaft of engine 12 is connected to the disconnect clutch 18, which in turn is connected to the input shaft for the M/G 14. The M/G 14 output shaft is connected to the launch clutch 22, which in turn is connected to the transmission 24. The components of driveline 26 of the vehicle 10 are positioned sequentially in series with one another.

A method or algorithm for use by the vehicle 10 includes opportunistic aftertreatment scheduling during qualified engine-on windows to improve both energy management and emissions in a diesel PHEV. The algorithm determines time windows during driving routes of the vehicle 10 that permit completion of an aftertreatment procedure, such as a DPF Regen, with low impact on fuel economy and vehicle drivability. The algorithm schedules the designated aftertreatment procedure at an appropriate time during the driving route. The determination of a 'qualified window' for the aftertreatment procedure during various drive cycles may depend on a predicted EOT during a driving cycle. The predicted EOT may be determined using historical usage patterns and/or future predicted information such as a route entered into the navigation system, real-time traffic, vehicle to vehicle (V2V) or vehicle to information (V2I) systems, etc.

The path, trip, or route may be entered or indicated by a user, or may be provided using an electronic horizon, which computes a route probability based on roads near the vehicle, the direction or the vehicle, etc. The controller 38 for the vehicle uses historical and predictive information to create a predicted vehicle speed or power profile for a drive cycle or a portion of a drive cycle. Using the predicted profile, the controller 38 may predict when an engine pull up may occur, and how long the EOT may be. For example, the controller 38 may determine that the engine 12 will operate when the vehicle is on a highway based on a vehicle speed or power profile and vehicle requirements. The electronic horizon may use a highway path and the distance to the next exit as future predicted information, and then switch to an unknown, unpredicted future. The EOT may be associated with a single engine pull up, or may be associated with multiple engine pull ups during a designated time period.

Figure 2:
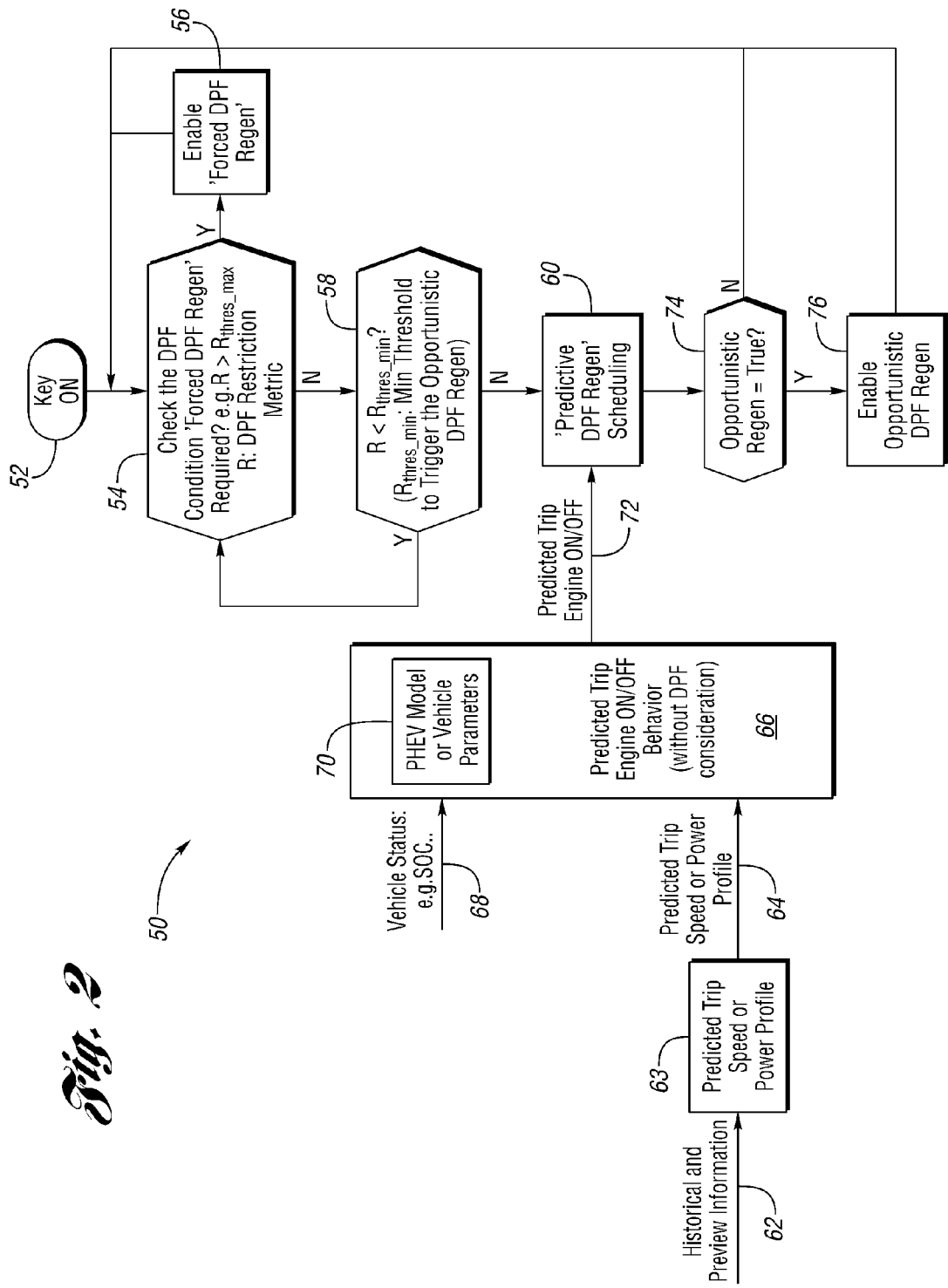
FIG. 2 is a flow chart of an algorithm for controlling aftertreatment for use with the vehicle of FIG. 1.

FIG. 2 illustrates an embodiment of the algorithm 50 for use with a control system for a vehicle having a diesel engine, such as the control system 44 for HEV 10 with a DPF aftertreatment system 16 as shown in FIG. 1. The algorithm 50 starts at 52, such as after a vehicle key-on event. At 54, the control system 44 determines if there is a forced DPF Regen condition requiring a forced engine pull up (FEPU) in order to conduct the DPF Regen.

The DPF 16 condition may be monitored using a system restriction metric, R, which is a signal computed by the ECU 42 and correlated with a measured backpressure difference across the DPF 16. The metric is essentially a normalized pressure drop and is an indicating signal for DPF conditions. The metric reflects the cumulative effects of increasing particulate loading in the filter 16 over time. When the metric reaches or exceeds a predetermined value, or high threshold, a regeneration cycle is requested. Depending on engine 12 operating conditions, this request is eventually granted.

If there is an immediate need or prompt to conduct an aftertreatment procedure which requires the engine 12 on at 54, the engine 12 is pulled up and the aftertreatment is performed at 56. An example of a condition for a forced DPF Regen includes a high level of particulate matter in the DPF, such as an R greater than 90%. Due to the opportunistic aftertreatment strategy as described below, the occurrence of a forced aftertreatment procedure may be reduced.

If no immediate or forced aftertreatment-based engine-on state is required at 54, the algorithm proceeds to 58, where the controller 38 compares the DPF restriction metric against a low threshold value. The low threshold value represents a value where opportunistic DPF Regen (or DPF Regen in general) is not triggered or performed. For example, if the restriction metric is less than the low threshold, i.e. R<10%, no Regen will be scheduled or performed even if the other entry conditions for an opportunistic DPF Regen are present.

If the restriction metric is not above the high threshold, and is not below the low threshold, the algorithm 50 proceeds to 60 for opportunistic DPF Regen scheduling.

The algorithm 50 receives historical and/or predicted information 62 to estimate a predicted trip speed profile (or vehicle power demand profile) at 64 using sub-step 63. The engine ON/OFF behavior 72, without DPF consideration, is subsequently estimated in 66 using a vehicle model 70 based on the predicted power demand profile from 64 and other vehicle status information 68, e.g. the SOC conditions. The engine ON/OFF profile 72 associated with the predicted profile 64 is provided to the predictive scheduler 60.

The scheduler 60 may set a flag or the like for opportunistic scheduling at 74. When the flag at 74 for opportunistic scheduling is true, an opportunistic DPF Regen procedure is enabled and initiated at 76.

Figure 3:
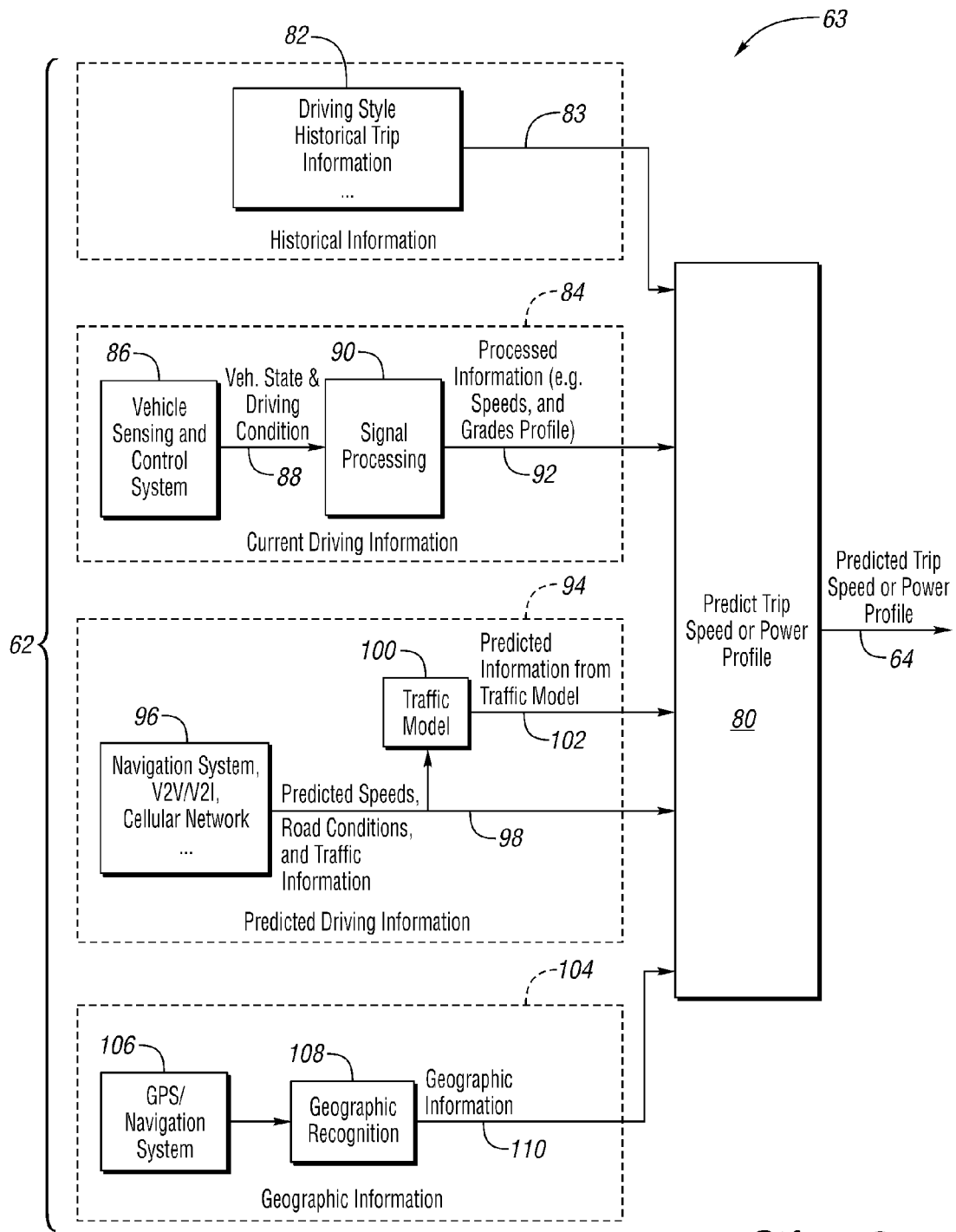
FIG. 3 is a flow chart illustrating a sub-step of FIG. 2 according to an embodiment.

FIG. 3 illustrates sub-step 63, which is used to predict a vehicle speed or power profile 64 for a trip or designated time window using an arbitration process 80. Various sources of historical, current, and predicted information 62 are provided to the arbitration process 80 in sub-step 63.

A historical driving information process 82 may provide historical driving information 83 to the arbitration process 80. The historical driving information process 82 may determine historical information 83 from known driving information for the vehicle or for an identified driver or a default driver of the vehicle, including the driving style, historical routing habits, driving data, etc.

A current driving information process 84 may also provide information to the arbitration process 80. The current driving information 84, such as speeds and grades profile, may be derived and processed from vehicle states and driving conditions recorded during an immediately recent time period [t−T, t]. The VSC 38 uses various sensors and information at 86 to provide vehicle state information 88, such as engine state, battery state, and other driving conditions, to a signal processor 90. The signal processor 90 uses the vehicle state information 88 to determine processed data 92, such as vehicle speed, grade profile, etc.

A predicted or future driving information process 94 is also provided to the arbitration process 80. The predicted driving information process 94 uses information derived from various predictive information sources 96, such as signals and data from an onboard navigation system with global positioning, a vehicle to vehicle system (V2V), a vehicle to roadside infrastructure system (V2I), a cellular network, or the like which may provide route information 98 such as the route speed limits, average speeds, average accelerations, predicted vehicle speeds, predicted road conditions, distances, etc. Additional route related information 98 can be supplemented by traffic models 100 to provide traffic information 102 including modifications to route information 98 due to traffic congestion, accidents, construction, rerouting information, etc.

The geographic information 104 uses a geographic recognition algorithm 108 to determine geographic information of the trip 110 using data from predictive information sources 106, such as signals and data from an on-board navigation system with global positioning, or the like.

The arbitration process 80 receives one or more of historical information 83, current vehicle processed data 92, predicted information 98, predicted traffic information 102, and geographic information 110 to determine a predicted vehicle trip speed or power profile 64.

Figure 4:
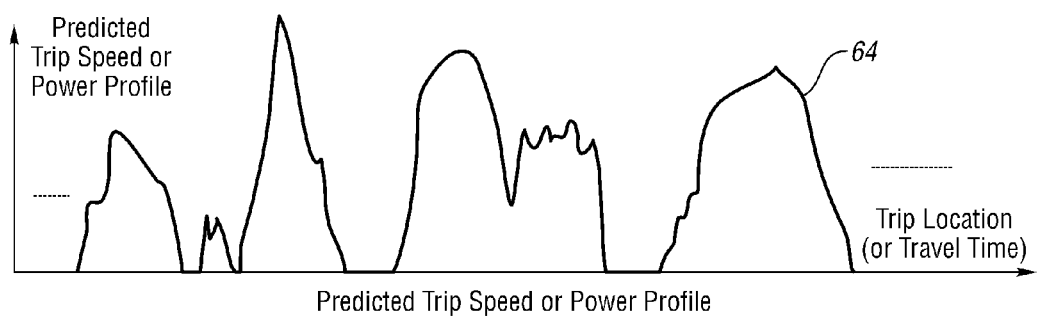
FIG. 4 is a predictive vehicle trip profile as determined using the sub-step of FIG. 3.

An example of a vehicle speed or power profile 64 for a trip or designated time period as determined by process 80 is illustrated in FIG. 4. The profile may represent a predicted vehicle speed or a predicted vehicle power demand. The profile 64 may be a function in either a location domain (e.g., speed or power versus trip location) or a time domain (e.g., speed or power versus time).

For example, the process 80 may first predict a raw trip speed profile as a function of the trip location based on known speed limits and road geometry data. The process 80 may then improve the prediction accuracy by taking more information into consideration based on its availability. Various techniques may be employed either alone or in combination within the process 80 and the prediction equations to improve the accuracy of the profile 64 estimation. These techniques include extracting of historical and statistical driving data for a given route, adjusting the profile 64 by calculating a desired speed on long tangents and a desired operating speed on curves, applying statistical acceleration and deceleration rates, adjusting the profile 64 based on a driving style and real-time traffic information, and the like.

Figure 5:
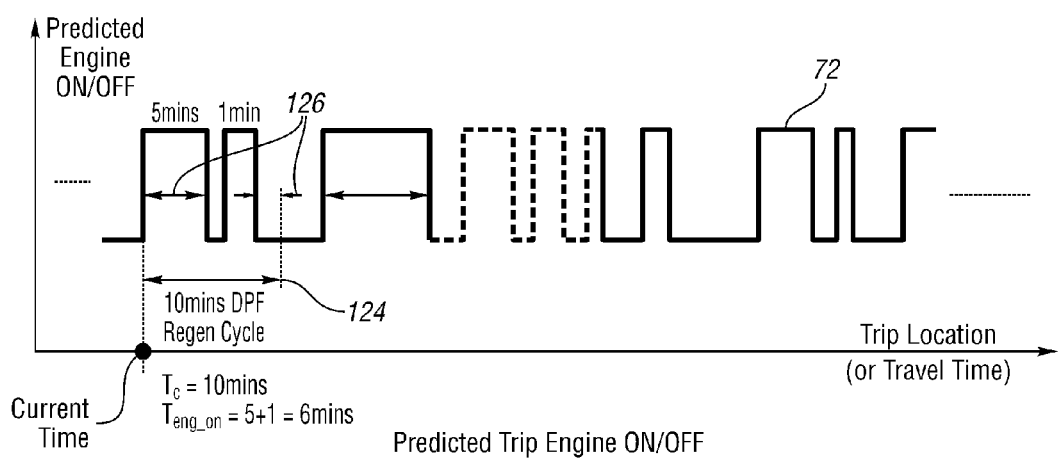
FIG. 5 is a predictive engine state profile according to an embodiment.

Referring back to FIG. 2, the profile 64 and the vehicle status 68 are input to a vehicle model at 66 to determine an engine ON/OFF behavior corresponding to the profile 64. An example of an engine ON/OFF profile 72 is illustrated in FIG. 5. The engine ON/OFF behavior 72 over a predicted horizon (can be represented either in a spatial or time domain, i.e., trip or time period) may be inferred from model simulations, or approximately calculated based on vehicle parameters and known control algorithms.

For example, the engine ON/OFF 72 may be scheduled primarily based on SOC of the battery and a driver power command by comparison with a set of thresholds. The engine ON/OFF 72 may be readily calculated and estimated if an estimated power profile 64 and SOC conditions are available. The engine ON/OFF prediction 72 may be estimated as if there was no FEPU from an aftertreatment procedure, i.e. no DPF-based engine ON/OFF requirement.

The model 70 results in a predicted engine ON/OFF pattern 72 as illustrated in FIG. 5 as a function in a location domain (e.g., trip location) or a time domain (e.g., the travel time).

Figure 6:
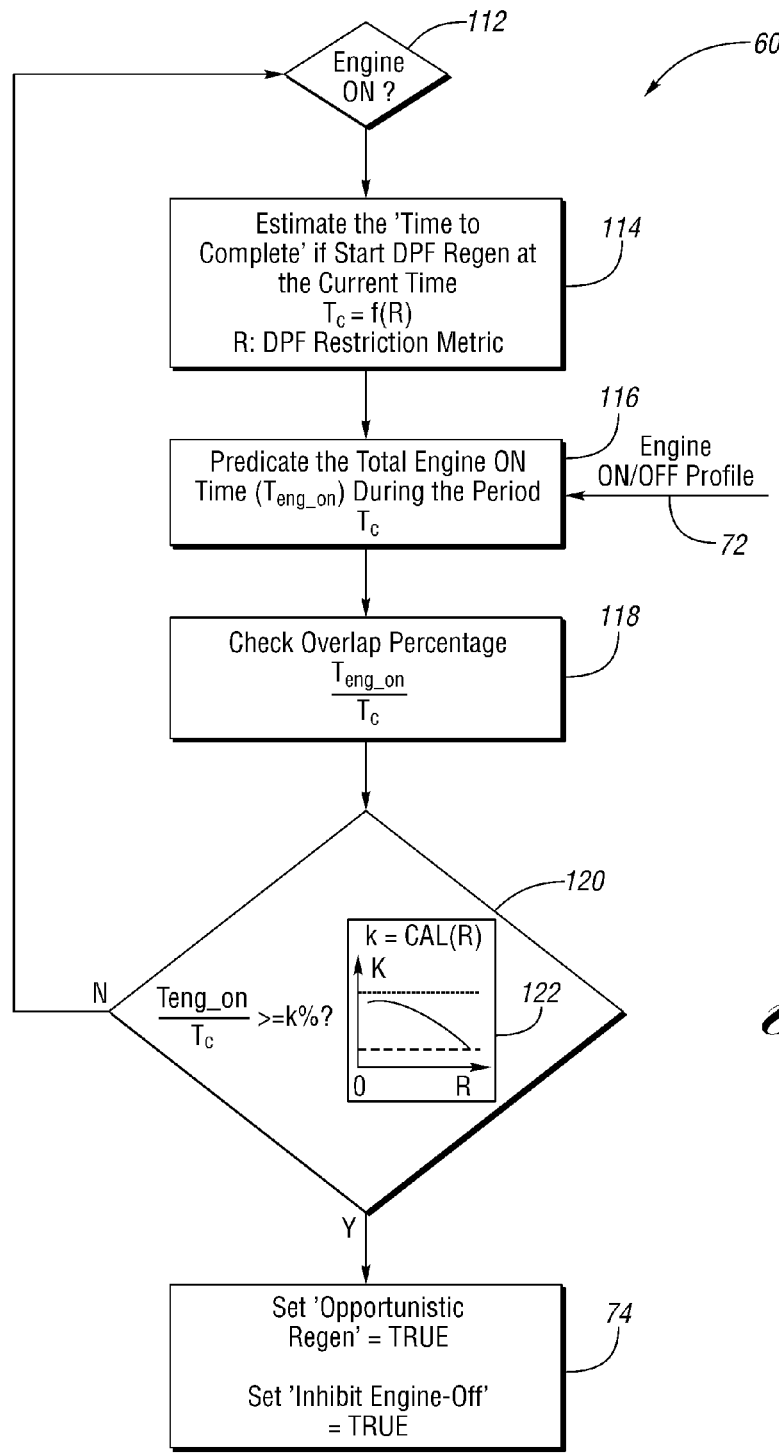
FIG. 6 is a flow chart illustrating a sub-step of FIG. 2 according to an embodiment.

The engine ON/OFF profile 72 is used as an input to the scheduling algorithm 60, as illustrated in FIGS. 2 and 6. The DPF Regen scheduling at 60 determines a time to schedule and initiate an opportunistic DPF Regen and monitors for engine-on (or engine pull up) requests 112 that are triggered by a vehicle state, such as a driving command (i.e. total power command, or speed request), SOC condition, temperature, overvoltage protection, climate request, or the like. When such an engine-on request 112 occurs, the sub-step 60 proceeds to 114 to estimate the time to complete the aftertreatment procedure ($T_c$), or DPF Regen, assuming the procedure begins at the current time.

The $T_c$ for a given aftertreatment procedure may be a function of the aftertreatment conditions. For example, the $T_c$ for a DPF regeneration may be calculated from the system restriction metric, R, sent by the ECU 42 and correlated with a measured backpressure difference across the DPF. Depending on the R value, the time to complete a DPF Regen cycle may be inferred as a function of $T_{dpf}=f(R)$, from an on-board vehicle calculation using a model or from a calibration table determined through vehicle testing.

After determining the $T_c$ at 114, the algorithm 60 proceeds to determine the engine-on time (EOT) at 116, which is the EOT ($T_{eng\_on}$) during the period $T_c$. The calculation 116 is based on the predicted engine ON/OFF profile 72.

Step 118 uses the EOT and $T_c$ to calculate an overlap percentage between EOT and $T_c$.

Step 120 uses the overlap percentage and conducts an arbitration step to determine if the overlap is sufficiently long for an opportunistic aftertreatment procedure, or DPF Regen. Step 120 compares the overlap percentage with a threshold k value. The k value is determined using a calibration table 122 based on emission conditions, i.e. the DPF R value. As the need for an aftertreatment procedure increases (R increases), the k value decreases. The k value is calibrated based on a variety of test conditions to balance a tradeoff between fuel economy and emissions requirements.

If the overlap percentage is less than the k value, the algorithm determines at step 120 that the aftertreatment will wait, and returns to step 112. If the overlap percentage is equal to or greater than the k value, an opportunistic aftertreatment procedure may occur, and proceeds to step 122. At 122, an aftertreatment procedure flag is set at 74. An 'Inhibit Engine-Off' signal will also be set to maintain an engine-on state until the DPF Regen is completed to prevent an interruption of the aftertreatment procedure by an unrelated engine pull down request.

In an example shown in FIG. 5, a $T_c$ window 124 of approximately ten minutes is determined using 114, meaning it takes around ten minutes to complete a DPF Regen if the procedure is initiated at the current time. The engine ON times 126 during $T_c$ 124 are estimated to be around six minutes at 116. The overlap percentage as calculated in 118 is $T_{eng\_on}/T_c=60\%$, i.e, there is 60% overlap between the two time windows $T_{eng\_on}$ and $T_c$. If the DPF has a high level of particulate matter, it will result in a higher R value and by extension, a lower k value for example k=20%, as shown by calibration table 122 used in step 120. The overlap percentage is therefore greater than the k value (60%>20%), and an opportunistic DPF Regen will be enabled and initiated at 74. In another example, the DPF particulate load is low and k is at 90% based on the R value. The overlap percentage is therefore less than the k value (60%<90%), and the opportunistic DPF Regen is deferred to a later time and the algorithm 60 return to 112.

The use of the method or algorithm in a vehicle may be detected in various ways. The occurrence of any aftertreatment procedures and the engine on and off status are easily accessible in a vehicle, such as through vehicle gauges, an on-board diagnostic interface, simple sensors, vehicle tests, etc. Input variables to the algorithm may include the route type, SOC, vehicle speed, vehicle weight, etc. The output variable is the occurrence of the aftertreatment procedures. Use of the method in a vehicle may be detected through test procedures.

A drive profile favorable for a known aftertreatment procedure may be entered by the vehicle. If the aftertreatment procedure is triggered, the decision was based on the assumed future or predicted driving profile. The test may be conducted for multiple driving profiles to increase the statistical certainty of the use of the algorithm. The occurrences of the aftertreatment procedures and the engine on and off status may be statistically correlated. When the algorithm turns on in a vehicle, more aftertreatment procedures will occur during qualified trip segments.

Various advantages may be associated with the disclosed embodiments. For example, the algorithms disclosed use predictive information to intelligently optimize the aftertreatment occurrences in a diesel hybrid vehicle or conventional diesel vehicle, and may significantly improve both fuel economy and emissions of the vehicle.

The methods and algorithms are independent of any particular programming language, operating system processor, or circuitry used to develop and/or implement the control logic illustrated. Likewise, depending upon the particular programming language and processing strategy, various functions may be performed in the sequence illustrated at substantially the same time or in a different sequence. The illustrated functions may be modified or in some cases omitted without departing from the spirit or scope of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A vehicle comprising:
   a compression ignition engine having an exhaust aftertreatment system; and
   a controller electronically coupled to the engine wherein the controller is configured to: (i) operate the engine based on an engine-on request, and (ii) perform an exhaust aftertreatment procedure for the vehicle when an engine-on fraction for a designated time is greater than an aftertreatment condition threshold.

2. The vehicle of claim 1 wherein the exhaust aftertreatment system is a diesel particulate filter.

3. The vehicle of claim 1 wherein the controller is configured to determine the engine-on fraction from an engine-on time and a time to complete the aftertreatment procedure.

4. The vehicle of claim 1 further comprising an electric machine.

5. The vehicle of claim 4 wherein the engine is coupled to the electric machine using an upstream clutch, and the electric machine is coupled to a transmission using a downstream clutch; and
   wherein the engine, the electric machine, and the transmission are arranged sequentially.

6. A computer readable medium having stored data representing instructions executable by a controller to control a vehicle, comprising:
   instructions for operating the engine based on an engine-on request; and
   instructions for performing an exhaust aftertreatment procedure for the vehicle when an engine-on time fraction is greater than an aftertreatment condition threshold.

7. A method to control a hybrid electric vehicle having a compression ignition engine, the method comprising:
   operating a compression ignition engine based on an engine-on request; and
   performing an exhaust aftertreatment procedure when a fraction of an engine-on time is greater than an aftertreatment condition threshold.

8. The method of claim 1 further comprising calculating the fraction from the engine-on time during a completion time for the aftertreatment procedure.

9. The method of claim 8 further comprising determining the completion time for the aftertreatment procedure from a state of an exhaust aftertreatment system.

10. The method of claim 8 further comprising determining the engine-on time during the completion time using an engine state profile.

11. The method of claim 10 further comprising determining the engine state profile from a vehicle trip profile.

12. The method of claim 11 further comprising determining the vehicle trip profile from at least one of historical information, current vehicle information, predicted information, and geographic information.

13. The method of claim 1 further comprising measuring a state of the vehicle and a state of the aftertreatment system to determine the fraction of an engine-on time.

14. The method of claim 13 further comprising providing trip information to determine the fraction of an engine-on time.

15. The method of claim 7 wherein the aftertreatment condition threshold depends on a state of an exhaust aftertreatment system.

16. The method of claim 7 wherein the engine is a diesel engine.

17. The method of claim 7 wherein the aftertreatment procedure is a diesel particulate filter regeneration.

18. The method of claim 7 wherein the engine-on request is based on a vehicle power demand.

19. The method of claim 7 wherein the engine-on request is based on a battery state of charge requirement.

20. The method of claim 7 further comprising performing an exhaust aftertreatment procedure for the vehicle while operating the engine when the engine-on request is based on an aftertreatment system requirement.

* * * * *